(12) United States Patent
Hayden (10) Patent No.: US 7,357,132 B2
(45) Date of Patent: Apr. 15, 2008

(54) POSITIONING SYSTEM AND METHOD OF ORIENTING AN OBJECT USING SAME

(75) Inventor: Herbert T. Hayden, Tempe, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 158 days.

(21) Appl. No.: 10/985,794

(22) Filed: Nov. 9, 2004

(65) Prior Publication Data
US 2006/0096586 A1    May 11, 2006

(51) Int. Cl.
F24J 2/40 (2006.01)
F24J 2/54 (2006.01)
F16D 55/10 (2006.01)
B23Q 16/00 (2006.01)

(52) U.S. Cl. ............... 126/604; 126/571; 188/72.6; 74/813 C; 74/822

(58) Field of Classification Search ............. 126/600, 126/570, 571, 572, 601, 604; 353/3; 359/853; 188/382, 72.4, 72.6, 151; 74/126, 127, 813 R, 74/813 L, 822
See application file for complete search history.

(56) References Cited

U.S. PATENT DOCUMENTS

| 1,976,428 | A | * | 10/1934 | Arthuys et al. ............... 353/3 |
| 3,523,599 | A | * | 8/1970 | Denkowski ................. 192/150 |
| 3,762,166 | A | | 10/1973 | Dunham |
| 3,935,793 | A | | 2/1976 | Murakami |
| 4,256,088 | A | | 3/1981 | Vindum |
| 4,354,484 | A | * | 10/1982 | Malone et al. ............... 126/602 |
| 4,387,702 | A | * | 6/1983 | Murphy et al. ............. 126/581 |
| 4,422,265 | A | * | 12/1983 | Branston .................... 451/147 |
| 4,432,343 | A | | 2/1984 | Riise et al. |
| 4,510,385 | A | * | 4/1985 | Welman ..................... 126/690 |
| 4,870,949 | A | | 10/1989 | Butler |
| 5,076,379 | A | | 12/1991 | Bahr et al. |
| 5,220,731 | A | | 6/1993 | Waclawik et al. |
| 5,267,778 | A | * | 12/1993 | Krebs et al. ................ 297/330 |
| 5,275,149 | A | | 1/1994 | Ludlow |
| 5,325,844 | A | | 7/1994 | Rogers et al. |

(Continued)

FOREIGN PATENT DOCUMENTS

JP    59-119148  A  *  7/1984

(Continued)

Primary Examiner—Josiah C. Cocks
(74) Attorney, Agent, or Firm—Jordan M. Meschkow; Lowell W. Gresham; Charlene Jacobsen (57) ABSTRACT

A system (22) for orienting an object (28) relative to a base (24) to which the object (28) is rotatably coupled includes a braking surface (46) in fixed relation with the base (24). A brake (48) is engaged with the braking surface (46). A linear actuator (82) has a body (86) in fixed attachment with the object (28) via a strap member (84) and a coupling element (80). The linear actuator (82) also includes a rod (88) in fixed communication with the brake (48) through an elongate member (90) that flexes in response to a braking force (66) imposed on the braking surface (46) by the brake (48). The linear actuator is activated to generate linear motion (120) of the rod (88). The linear motion (120) of the rod (88) causes rotational motion (122) of the object (28). The strap member (84) is enabled to flex as the object (28) rotates.

30 Claims, 8 Drawing Sheets

U.S. PATENT DOCUMENTS

| | | |
|---|---|---|
| 5,908,098 A | 6/1999 | Gorman et al. |
| 6,058,930 A | 5/2000 | Shingleton |
| 6,123,067 A | 9/2000 | Warrick |
| 6,557,804 B1 | 5/2003 | Carroll |
| 6,662,801 B2 | 12/2003 | Hayden et al. |
| 2002/0023638 A1 | 2/2002 | Buron et al. |
| 2002/0175029 A1 | 11/2002 | Saruwatari et al. |
| 2003/0158013 A1 | 8/2003 | Sich et al. |

FOREIGN PATENT DOCUMENTS

| | | |
|---|---|---|
| JP | 02154853 A | 6/1990 |
| JP | 04000047 A | 1/1992 |
| JP | 04175547 A | 6/1992 |
| JP | 04258510 A | 9/1992 |
| JP | 09076172 A | 3/1997 |
| JP | 2003148581 A | 5/2003 |
| WO | WO 2004/031614 A1 | 4/2004 |

* cited by examiner

POSITIONING SYSTEM AND METHOD OF ORIENTING AN OBJECT USING SAME

TECHNICAL FIELD OF THE INVENTION

The present invention relates to the field of positioning systems. More specifically, the present invention relates to a system for precise orientation of an object about an axis.

BACKGROUND OF THE INVENTION

Celestial tracking apparatuses are devices that track or face a given object in the celestial hemisphere during normal operations. Such apparatuses are typically configured for use as telescopes, radio telescopes, radar systems, directional antennas, solar collectors, solar dishes, and so forth.

Such tracking systems typically employ two independent systems to tilt the object, i.e., the telescope, radar dish, antenna, collector, and so forth, about two axes. In one arrangement, one axis is horizontal, commonly called "elevation". The elevation axis is the axis about which the object may be tilted within an angular range of about ninety degrees, from the horizon to looking straight up. The other axis is vertical, commonly called "azimuth." The azimuth axis is the axis about which the object may be rotated around the horizon. When a tracking system is configured for use as a solar collector, the azimuth positioning system may orient the solar collector approximately eastward at the beginning of the day and end the day with the solar collector oriented approximately westward. The angular rotation, i.e., the elevation range, depends upon the earth's latitude at which the solar collector is installed and the time of year. This exemplary arrangement enables positioning in three dimensions. Those skilled in the art will readily recognize that other arrangements of tracking systems exist for positioning in two and/or three dimensions. Those skilled in the art will readily recognize that other arrangements of tracking systems exist for positioning in two and/or three dimensions.

A number of tracking and control systems are available for positioning small, lightweight objects, and many of such tracking and control systems can achieve respectable tracking precision. Such small positioning systems typically use electrical motor-driven gear reduction drives, harmonic drives, and the like. However, in the field of solar-collecting arrays, economics is encouraging the use of larger and larger solar-concentrating arrays which require highly precise tracking of a very large object. Unfortunately, the highly precise tracking and control systems that are desirable for use with smaller objects are prohibitively expensive for larger systems.

Moreover, some prior art positioning systems for large objects, such as solar collectors, suffer from positional uncertainty (e.g., approximately 0.5° to 2°). Several factors are believed to contribute to this uncertainty. One factor is the use of bearings and other linkages to couple between a driving mechanism and the driven mechanism. The bearings and other linkages can introduce some degree of backlash and non-linearity that detract from the precision of the positional movements. In addition, loads can deflect and deform the drive mechanism also detracting from the precision of the position movements, unless the system is stiff.

Large systems favor hydraulic drive mechanisms over electrical drive mechanisms for reasons of cost and strength. However, another factor that contributes to positional uncertainty in hydraulic systems is attributed to the compressibility of the oil used for the hydraulic systems. Typical hydraulic oils may compress roughly 0.5% for each 1000 psi. The pressure is dependent upon the load, and the load, in turn, may vary depending upon wind conditions and orientation of the load relative to gravity. In one exemplary system, the hydraulic system for a solar collector has a stroke of approximately 24 inches. Accordingly this 0.5% per 1000 psi uncertainty can translate into considerable uncertainty in position. Further uncertainty may result to the extent that air is entrained in the oil. In addition, the steel rods and other structural members can compress by varying amounts depending upon the loads experienced. For a longer member, such as the hydraulic system having a 24 inch stroke, the compressibility of the steel rods and other structural members will translate into a greater amount of position uncertainty.

Tracking assemblies that present large surface areas to the wind are subject to considerable wind stresses. When the wind exceeds a given speed, these stresses can become destructive. Accordingly, such tracking systems desirably require that the system be capable of going into a wind stow position to avoid damage from excessive wind speeds. "Wind stow" is an attitude of the tracked structure that presents the smallest surface area to the wind. Typically, a wind sensor will trigger a command for the system to assume the wind stow attitude.

There is delay associated with sensing an excessive wind speed, commanding the system to enter into a wind stow mode, and to physically assume the wind stow attitude. This delay may be acceptable when the wind is steady but increasing. However, there are several weather phenomena that can result in sudden, unpredictable increases in wind speed and direction. For example, a dust devil is a small, rapidly rotating column of wind resembling a small tornado that is made visible by the debris it picks up. A dust devil usually occurs in arid or semi-arid areas and is most likely to develop on clear, dry, hot afternoons in response to surface heating. Another weather phenomenon is known as a downdraft which is a sudden descent of cool or cold air to the ground usually with precipitation, and associated with a thunderstorm or shower. A downburst is a severe, localized downdraft from a thunderstorm or shower. An even more extreme weather phenomenon that can occur anywhere in the world, given the right conditions, is a tornado which is a violently rotating column of air. These sudden shifts in wind speed and/or wind direction can cause severe physical damage to celestial tracking systems and nearby property before such systems can be placed in a wind stow attitude.

Accordingly, what is needed is a positioning system for a large object that overcomes the problems of positional uncertainty found in prior art devices. Moreover, what is needed is a positioning system for a large object that works as an adjunct to, or in lieu of, a wind stow mechanism for protecting the object from sudden, unpredictable changes of wind speed and wind direction.

SUMMARY OF THE INVENTION

Accordingly, it is an advantage of the present invention that a system is provided for orienting an object relative to a base.

It is another advantage of the present invention that a system is provided that orients a heavy or large object with a high degree of precision.

Another advantage of the present invention is that a system is provided for orienting an object that experiences a highly variable load.

Another advantage of the present invention is that a system is provided that can precisely orient an object about an axis.

Another advantage of the present invention is that a system is provided that can protect an object from damage due to excessive wind speeds.

Yet another advantage of the present invention is that a system is provided that is cost effectively implemented for orienting a large object.

The above and other advantages of the present invention are carried out in one form by a system for orienting an object relative to a base to which the object is rotatably coupled. The system includes a braking surface in fixed relation with the base and a brake engaged with the braking surface. The system further includes a linear actuator having a body and a rod extensible from the body. The body is configured for fixed attachment with the object, and the rod is in fixed communication with the brake. The linear actuator is activated to generate linear motion of the rod, the linear motion causing rotational motion of the object about the base.

The above and other advantages of the present invention are carried out in another form by a method for orienting an object relative to a base to which the object is rotatably coupled utilizing a positioning system. The positioning system includes a braking surface in fixed relation with the base, a brake, and a linear actuator having a body in fixed attachment with the object and a rod extensible from the body and in fixed communication with the brake. The method calls for engaging the brake with the braking surface and activating the linear actuator to generate linear motion of the rod, the linear motion causing rotational motion of the object about the base.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

The present invention includes a positioning system and methodology for utilizing the positioning system to precisely orient an object relative to a base to which the object is rotatably coupled. In a preferred embodiment, the positioning system orients the object in azimuth. The object may be a device that is intended to face a given target in the celestial hemisphere during normal operations. Such devices include, but are not limited to, telescopes, radar systems, directional antennas, solar collectors, and other devices that track from above. Moreover, the object may be a large object, such as a crane. The term "large" refers to an object having a surface that exhibits an area of at least one hundred square meters. The term "large" can also refer to a heavy object, or an object subjected to heavy or variable loads, that may or may not have an area of at least one hundred square meters.

For clarity of illustration, the positioning device and methodology will be described in connection with a solar collection application. However, it should be understood that the present invention need not be limited for use with such celestial tracking devices. Rather, the present invention may be applicable for positioning any large object about one axis to produce rotation in one or more dimensions. It should be further noted that the present invention need not be limited to incorporation with "large" objects, but may be adapted for incorporation with smaller objects for which precise positioning about an axis is required.

Figure 1:
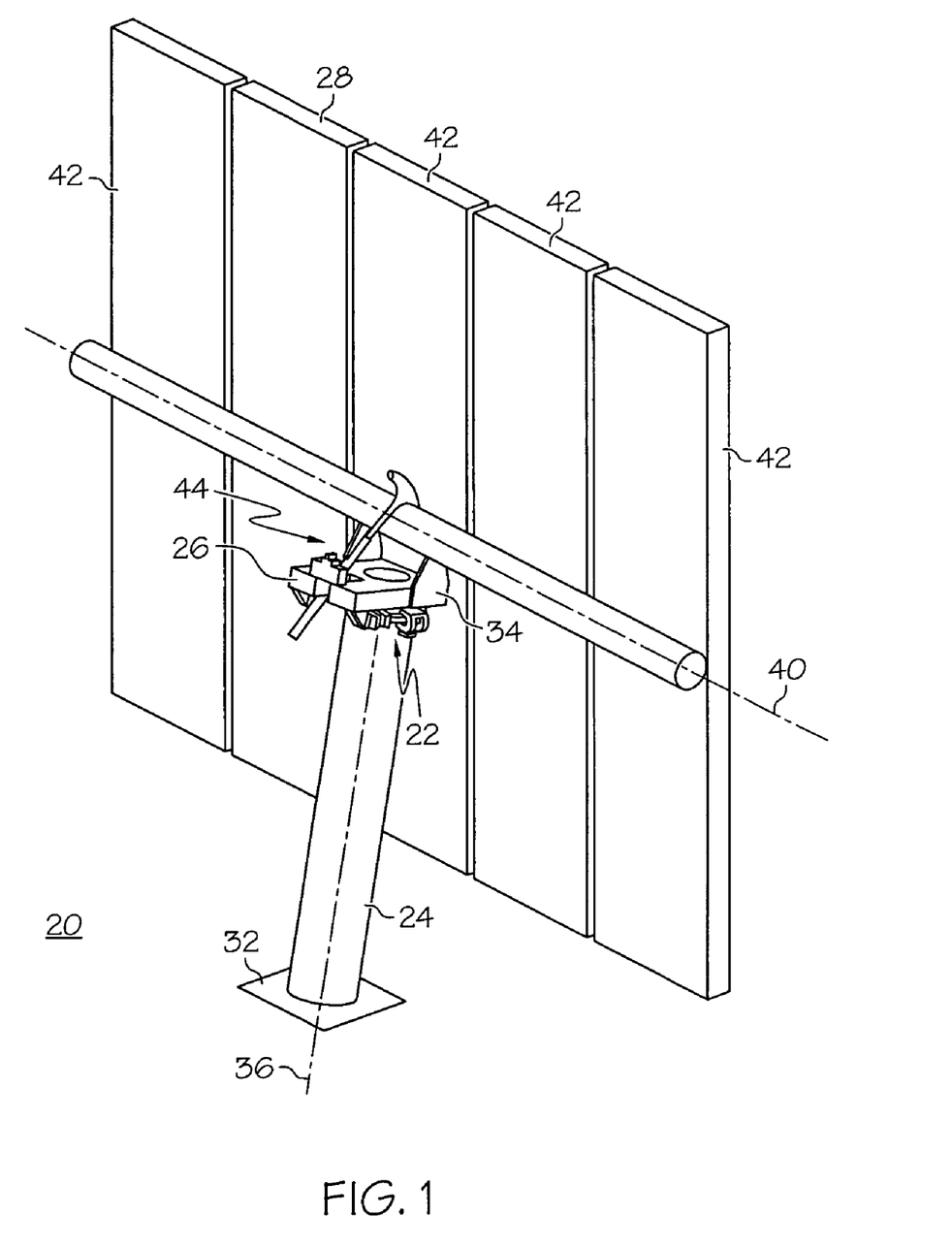
FIG. 1 shows a perspective rear view of a solar collection device including a positioning system in accordance with a preferred embodiment of the present invention.

FIG. 1 shows a solar collection device 20 into which a positioning system 22 is incorporated in accordance with a preferred embodiment of the present invention. Solar collection device 20 generally includes a base 24, a tracking assembly 26, and a concentrating, solar collector 28. Base 24 is substantially a rigid member (e.g., a steel tube) anchored into the ground by a concrete pad 32, thereby providing a stable foundation for tracking assembly 26 and solar collector 28.

Figure 2:
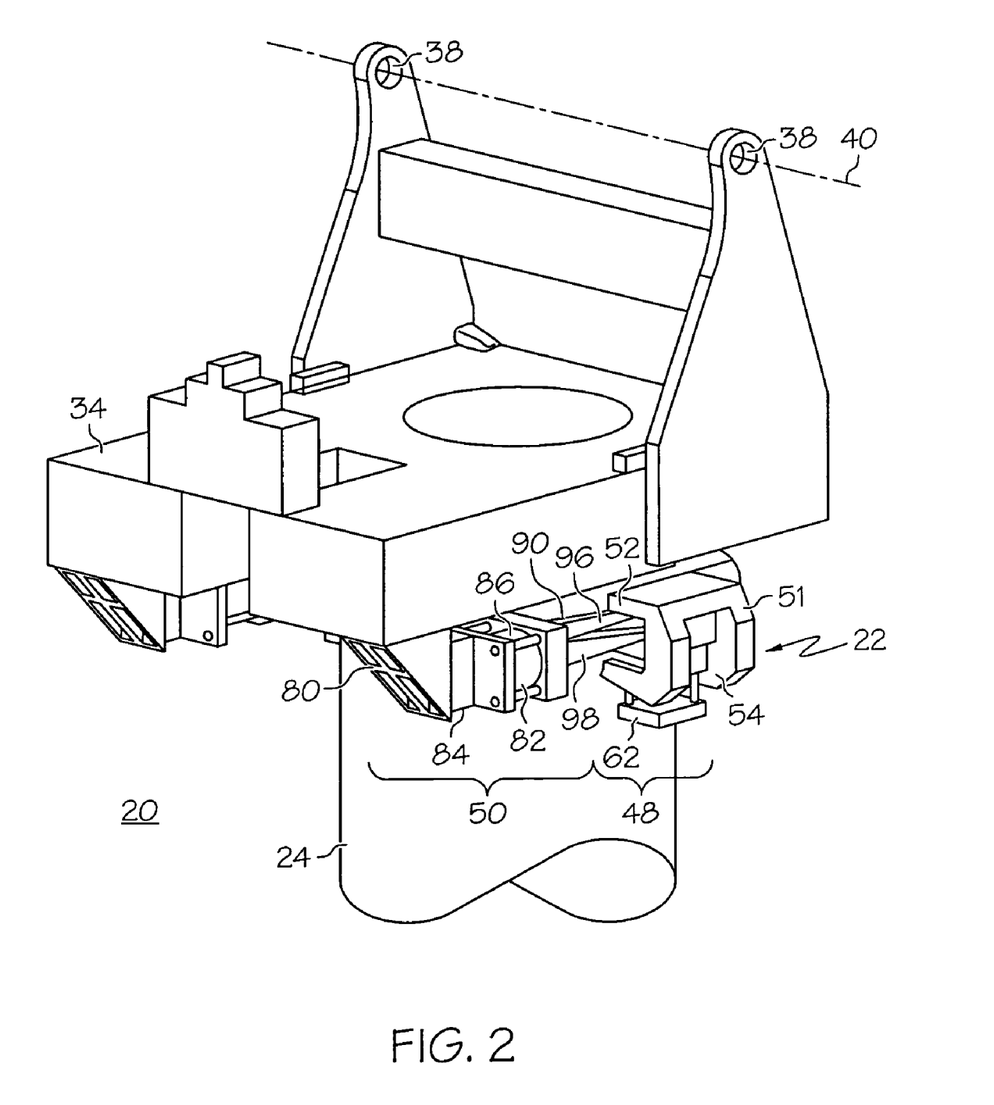
FIG. 2 shows a perspective rear view of a portion of the solar collection device and the azimuth positioning system of FIG. 1.

Tracking assembly 26 includes a cradle 34 positioned on top of and coupled to base 24 by way of a conventional turntable bearing (not shown). The turntable bearing is configured to allow cradle 34 and solar collector 28 coupled thereto to rotate about an azimuth axis 36 relative to base 24. Solar collector 28 is coupled to cradle 34, and thence to base 24, at a pair of elevation pivots 38 (FIG. 2). Elevation pivots 38 allow solar collector 28 to rotate about an elevation axis defined by pivots 38. Solar collector 28 encompasses collector panels 42, supports, and connection components (not shown for simplicity of illustration). In an exemplary solar collection device, collector panels 42 exhibit a collective surface area of at least 100 m² (approximately 1080 ft²), and may be considerably larger than 100 m². It will be appreciated that the exact shapes and descriptions of the collector panels, supports, and connection components are not relevant to the present invention and may vary widely.

In a preferred embodiment, positioning system 22 enables precise orientation of an object, in this case cradle 34 with the coupled solar collector 28, about azimuth axis 36. Accordingly, positioning system 22 will be referred to hereinafter as an azimuth positioning system 22. An independent elevation positioning system 44 may be employed to tilt solar collector 28 about the elevation axis. It should be understood that elevation positioning system 44, while being relevant for positioning solar collector 28 about elevation axis 40, does not face the same degree of backlash problems due to the force of gravity being a larger factor. Accordingly, the present invention will be described in connection with azimuth positioning, rather than elevation positioning. However, the present invention may optionally be adapted for the precision orientation of an object about an elevation axis.

Figure 3:
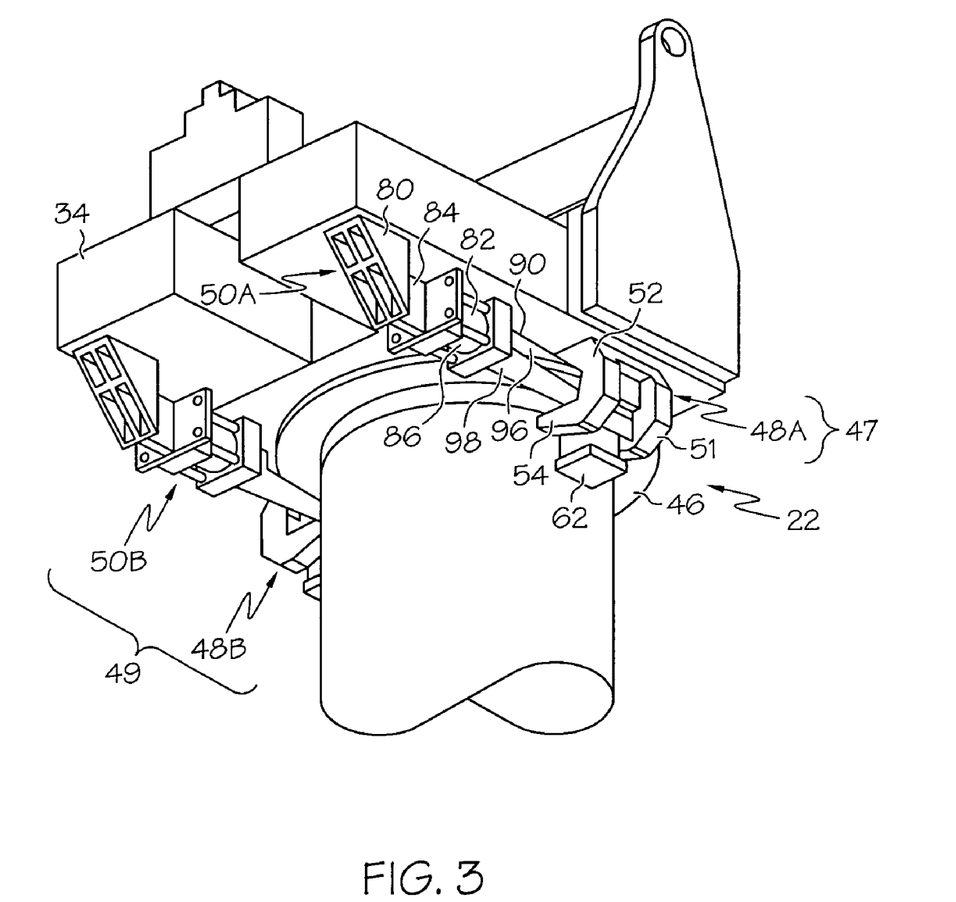
FIG. 3 shows a perspective rear, bottom view of a portion of the solar collection device and the azimuth positioning system of FIG. 1.
Figure 4:
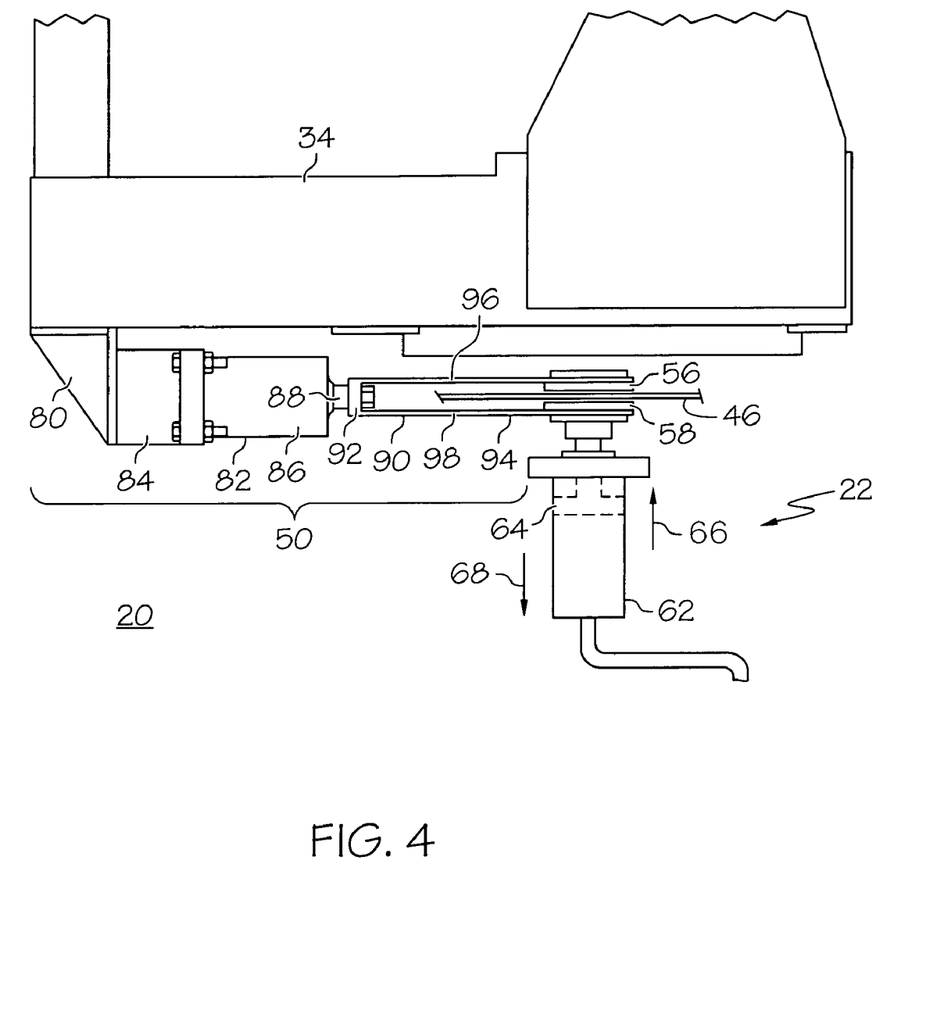
FIG. 4 shows a side view of a portion of the solar collection device and the azimuth positioning system of FIG. 1.

Referring to FIGS. 2-4, FIG. 2 shows a perspective rear view of a portion of solar collection device 20 and azimuth positioning system 22, and FIG. 3 shows a perspective rear, bottom view of a portion of solar collection device 20 and azimuth positioning system 22. FIG. 4 shows a side view of a portion of solar collection device 20 and azimuth positioning system 22.

Azimuth positioning system 22 generally includes a collar 46, a brake system 48, and a rotation actuation system 50. Collar 46 is in fixed relation with base 24. In this context, "fixed relation" means that there is no relative movement between collar 46 and base 24 in normal use. In an exemplary embodiment, collar 46 may have an inner radius of at least twenty inches, or in this case, approximately twenty-four inches, relative to azimuth axis 36. Collar 46 provides a braking surface that is utilized in cooperation with brake systems 48 (discussed below). Although a collar, in the form of an annular ring extending from base 24, is described herein, other elements may be employed to provide a braking surface in fixed relation to base 24. In an alternative scenario, an outer surface of base 24 may also function as the braking surface since the outer surface of base 24 is in fixed relation with base 24.

In a preferred embodiment, positioning system 22 includes two brake systems 48 and two rotation actuation systems 50. FIG. 3 particularly illustrates a first drive 47 in the foreground that includes a first brake system 48A and a first rotation actuation system 50A. A second drive 49, that includes a second brake system 48B and a second rotation actuation system 50B, is shown in the background. More specifically, second brake system 48B is located on an opposing diametrical side of collar 46 relative to first brake system 48A. First and second drives 47 and 49, respectively, work cooperatively to rotate the object, i.e., cradle 34 and solar collector 28, as will become apparent below. Generally, azimuth positioning system 22 generates linear motion utilizing first and second rotation actuation systems 50A and 50B. This linear motion is subsequently translated to rotational motion of the object, i.e., cradle 34 and solar collector 28, relative to base 24. Although the cooperative function of two drives for rotating an object are described below, it should be understood that the present invention may be adapted to include only one drive, or alternatively, more than two drives.

The following discussion of the components of brake system 48 and rotation actuation system 50 applies equally to first and second brake systems 48A and 48B, as well as to first and second rotation actuation systems 50A and 50B. Accordingly, the reference to "first" and "second" and the associated references characters "A" and "B" are being omitted for brevity.

Brake system 48 includes a caliper 51 having a first arm 52 and a second arm 54 straddling collar 46. A first brake pad 56 floats within caliper 51 proximate first arm 52 and a second brake pad 58 floats within caliper 51 proximate second arm 54. First and second brake pads 56 and 58, respectively, are best viewed in FIG. 4, which largely omits caliper 51. Brake system 48 is configured so that, first and second brake pads 56 and 58 may be engaged with collar 46. When first and second brake pads 56 and 58 are engaged with collar 46, collar 46 is tightly pinched or clamped between pads 56 and 58. Conversely, when first and second brake pads 56 and 58 are disengaged from collar 46, first and second brake pads 56 and 58 are removed from contact with collar 46, or at least the clamping pressure imposed between pads 56 and 58 is released. Although a caliper brake system is described herein, it should be understood that other friction application elements may alternatively be utilized. Other friction application elements include, for example, various brake systems, clutch systems, and the like.

Engagement of first and second brake pads 56 and 58 is controlled by a brake actuator 62 through which a braking force 66 is imparted toward first and second brake pads 56 and 58. Braking force 66 yields a clamping pressure between first and second brake pads 56 and 58, thus causing pads 56 and 58 to clamp tightly to collar 46. First and second brake pads 56 and 58 may be engaged through either an active configuration or a passive configuration. In the active configuration, first and second brake pads 56 and 58, respectively, are normally disengaged from collar 46, and are controlled so as to be engaged with collar 46 as needed. Conversely, in the passive configuration, first and second brake pads 56 and 58 are normally engaged with collar 46, and are controlled so as to be disengaged from collar 46 as needed.

In a preferred embodiment which is adapted to large objects, braking force 66 imposes a load of approximately 25,000 pounds applied through each brake system 48. Thus, with two brake systems 48, approximately 50,000 ft-lbs of torque are required before engaged brake systems 48A and 48B (FIG. 3) slip on collar 46. consequently, brake systems 48A and 48B securely maintain respective first and second brake pads 56 and 58 in engagement with collar 46 when the brake pads are engaged. On the other hand, when a high wind load causes typically on the order of 50,000 ft-lbs of torque, brake systems 48A and 48B will slip and allow solar collector 28 to weathervane so as to present a diminished surface area to the wind and reduce the likelihood of damage. The passive configuration with brakes normally engaged forms a fail-safe mode in which solar collector 28 cannot rotate under normal conditions, but can weathervane under sudden excessive wind loads before solar collector 28 can be placed in a wind stow position.

Brake actuator 62 may be a hydraulic linear actuator that produces braking force 66. That is, when brake actuator 62 is activated, a piston 64 of actuator 62 extends. Extension of piston 64 imparts braking force 66 toward first and second brake pads 56 and 58. Alternatively, brake actuator 62 may function in cooperation with an accumulator (not shown). For example, an accumulator may be coupled to an opposing side of a linear actuator from first and second brake pads 56 and 58. The accumulator may impart braking force 66 through the linear actuator toward first and second brake pads 56 and 58 so that first and second brake pads 56 and 58 are engaged with collar 46. When the linear actuator 62 is activated, piston 64 works against the accumulator, as indicated by an arrow 68, which subsequently results in the removal of first and second brake pads 56 and 58, respectively, from contact with collar 46, or at least results in the release of the clamping pressure imposed between pads 56 and 58. The sequence of events that leads to the engagement and disengagement of brake pads 56 and 58 from collar 46 will be discussed in connection with the flowchart of FIG. 6.

Rotation actuation system 50 includes a coupling element 80 configured for fixed attachment to cradle 34. Again, in this context, "fixed attachment" means that there is no relative movement between coupling element 80 and cradle 34 in normal use. Rotation actuation system 50 further includes a linear actuator 82 and a strap member 84 attached to and extending between coupling element 80 and linear actuator 82. Strap member 84 is relatively wide/broad in two dimensions, but is thin in a third dimension. The broad dimensions are quite strong and rigid so as to resist deformation by compression/tension. However, the strap member 84 is thin enough that it is able to flex in response to force imposed in the thin direction when linear actuator 82 is actuated. This flexing ability will be discussed in greater detail in connection with FIGS. 9-11.

Linear actuator 82, in the form of a hydraulic linear actuator, has a body 86 and a rod 88 extensible from body 86 (best seen in FIG. 4). In an exemplary embodiment, rod 88 is an elongated member having a generally circular cross-sectional configuration. However, it should be understood that rod 88 may alternatively be an elongated member extensible from body 86 having any of a number of cross-sectional configurations.

An elongate member 90 of rotation actuation system 50 has a first end 92 coupled to rod 88, and a second end 94 coupled to brake system 48. In a preferred embodiment, second end 94 of elongate member 90 includes a first tine 96 coupled to first brake pad 56 and a second tine 98 coupled to second brake pad 58. Like strap member 84, first and second tines 96 and 98, respectively, are relatively wide/broad in two dimensions, but are thin in a third dimension. The broad dimensions are quite rigid and resist deformation in the longitudinal direction and by compression. However, first and second tines 96 and 98 are thin enough that they are able to flex toward or away from one another in response to the engagement and removal of first and second brake pads 56 and 58, respectively. This flexing ability will be discussed in greater detail in connection with FIGS. 7-8.

Figure 5:
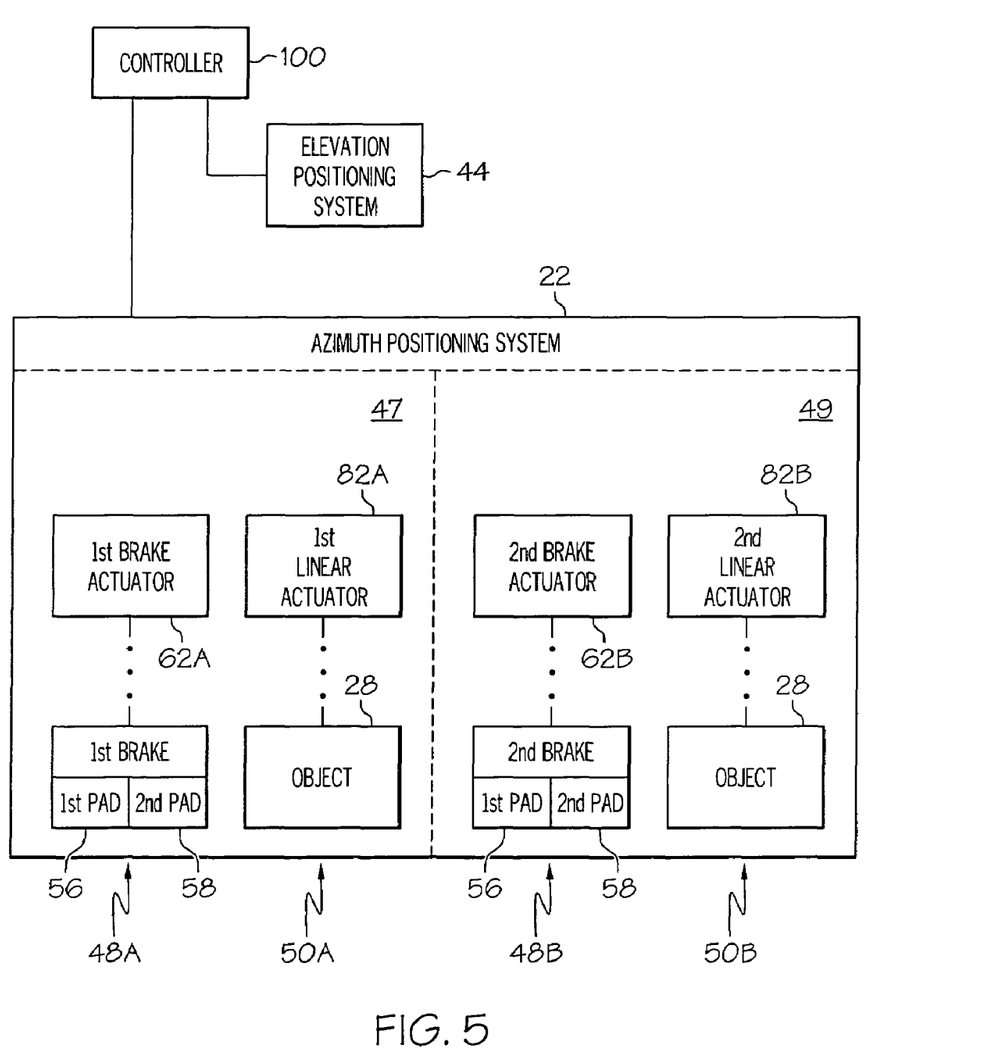
FIG. 5 shows a simplified block diagram of a controller for controlling orientation of the solar collecting device of FIG. 1.

FIG. 5 shows a simplified block diagram of a controller 100 for controlling orientation of solar collecting device 20. Controller 100 represents all of the circuitry, input/output components, software instructions, and other information (time, longitude, latitude, etc.) required to control elevation positioning system 44 and azimuth positioning system 22. Pertinent to the present invention, controller 100 controls activation of first and second drives 47 and 49, respectively, to precisely orient the object, i.e., solar collector 28, in azimuth. In particular, controller 100 is in communication with each of first brake actuator 62A, first linear actuator 82A, second brake actuator 62B, and second linear actuator 82B to control activation of one of first and second linear actuators 82A and 82B corresponding to the one of first and second brake systems 48A and 48B that is currently engaged with collar 46 (FIG. 3).

Figure 6:
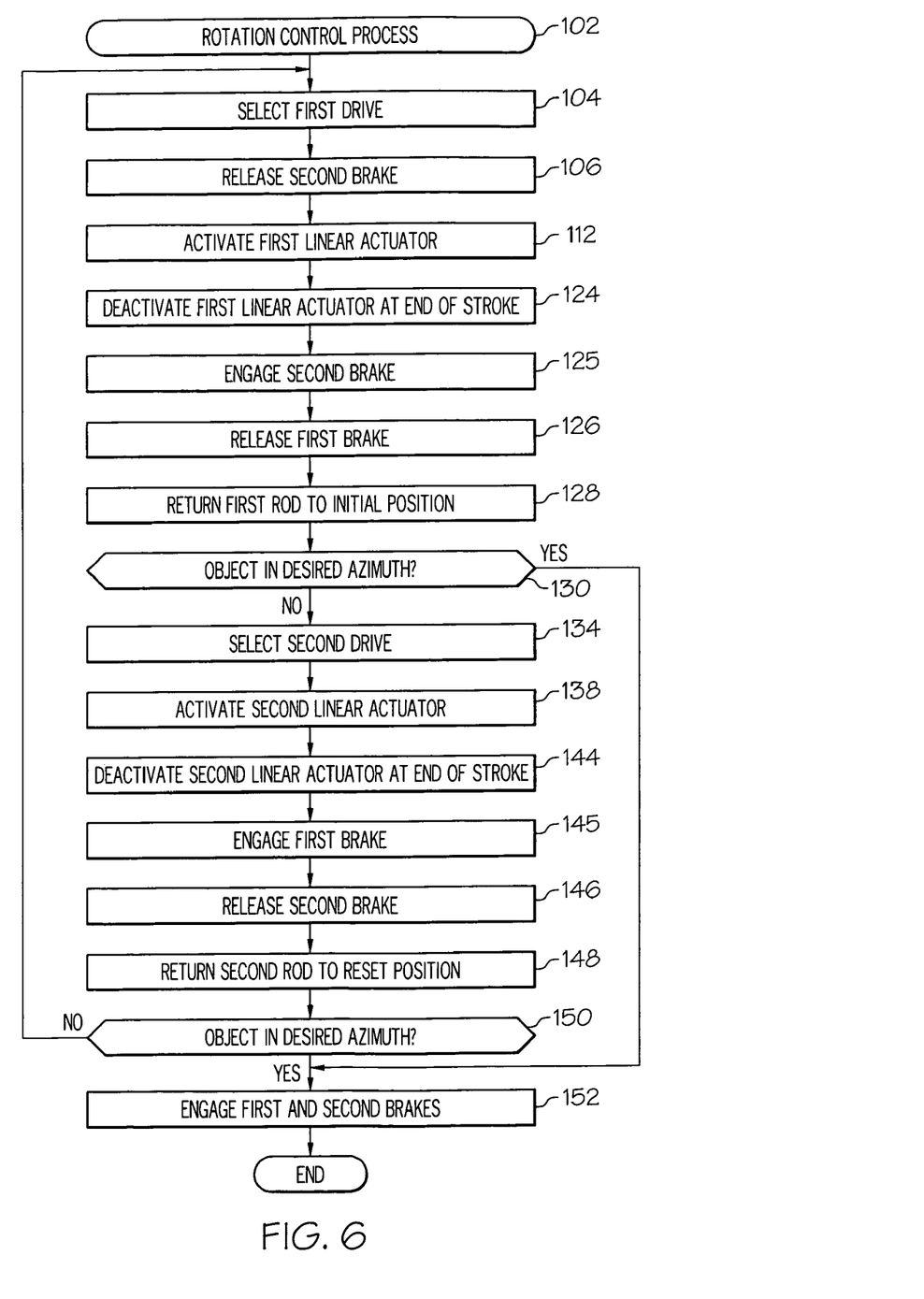
FIG. 6 shows a flowchart of a rotation control process for the azimuth positioning system in accordance with a preferred embodiment of the present invention.

FIG. 6 shows a flowchart of a rotation control process 102 for azimuth positioning system 22 in accordance with a preferred embodiment of the present invention. Process 102 represents those operations, performed either automatically or in response to signaling from controller 100 (FIG. 5), that cause rotational movement of solar collector 28 (FIG. 1) about base 24 (FIG. 1), i.e., to adjust solar collector 28 in azimuth. Process 102 is initiated when a determination is made either by controller 100, by an operator, or by another control mechanism that solar collector 28 should rotate about azimuth axis 36 (FIG. 1) to a desired position.

Process 102 begins with a task 104. At task 104, first drive 47 (FIG. 3) is selected for rotating cradle 34 with solar collector 28 (FIG. 1). In the passive configuration discussed above, first and second brake pads 56 and 58 (FIG. 4) are in engagement with collar 46. Accordingly, when solar collecting device (FIG. 1) is not currently being commanded to rotate about azimuth axis 36, i.e. prior to task 104, first and second brake systems 48A and 48B (FIG. 3) are currently engaged with collar 46 (FIG. 3) and the solar collecting device is held in a stationary position, excessive winds notwithstanding. Task 104 merely selects which brake system 48 and rotation actuation system 50 will be utilized to rotate solar collector 28.

A task 106 is performed in response to task 104. At task 106, second brake system 48B of second drive 49 (FIG. 3) is released from engagement with collar 46. That is, braking force 66 (FIG. 4) is removed resulting in the removal of clamping pressure between brake pads 56 and 58 and collar 46.

Figure 7:
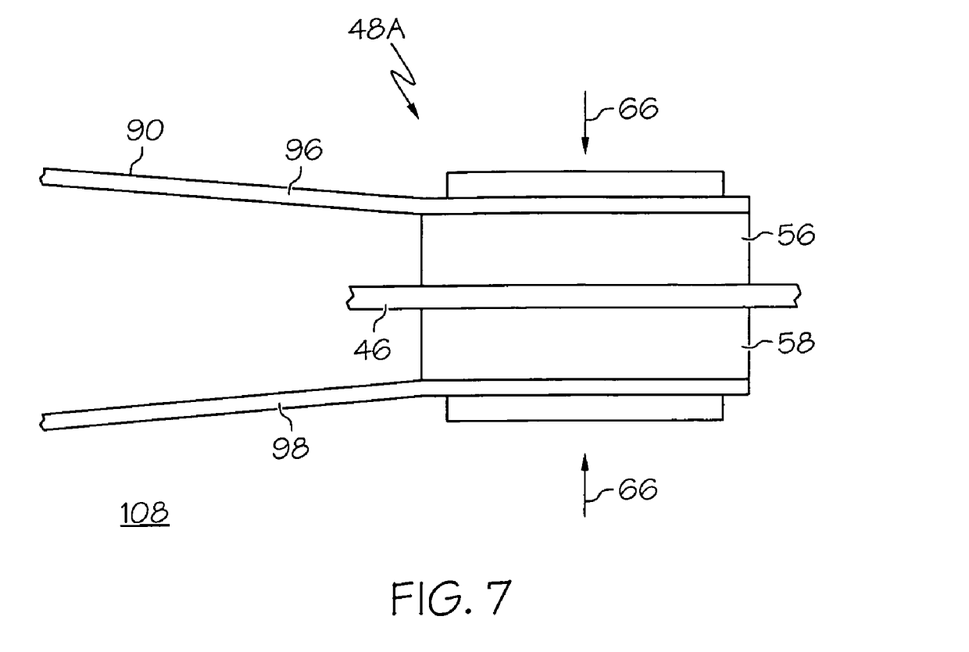
FIG. 7 shows a simplified side view of a portion of the azimuth positioning system of FIG. 1 demonstrating a brake-engaged condition.
Figure 8:
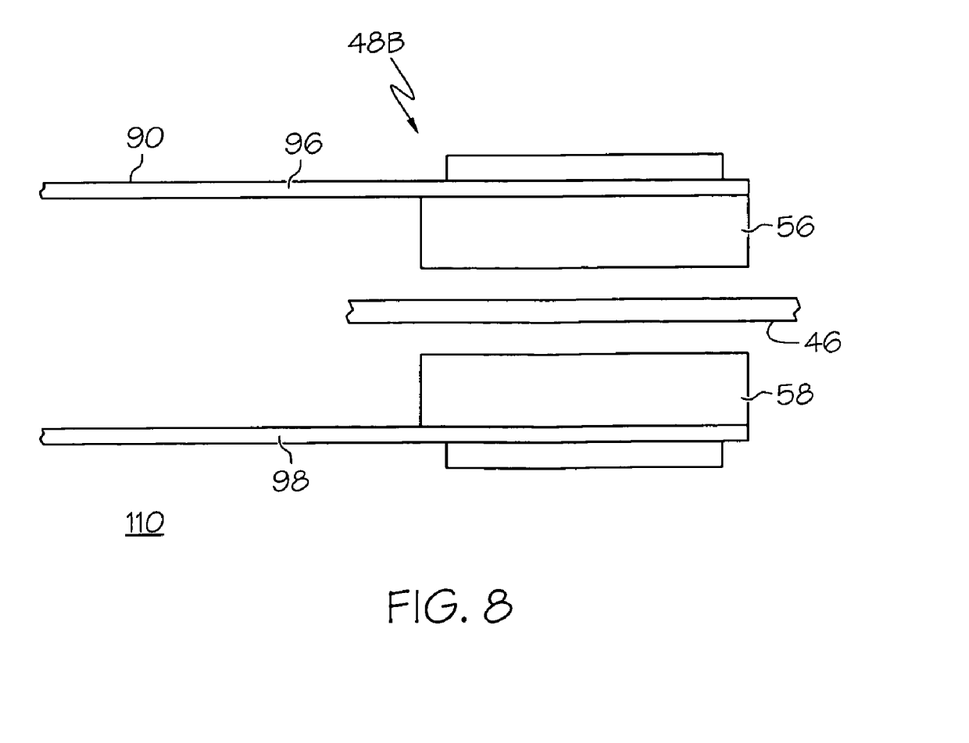
FIG. 8 shows a simplified side view of a portion of the azimuth positioning system demonstrating a brake-released condition.

Referring to FIGS. 7-8 in connection with tasks 104 and 106, FIG. 7 shows a simplified and exaggerated side view of a portion of azimuth positioning system 22 demonstrating a brake-engaged condition 108 of first brake system 48A. FIG. 8 shows a simplified and exaggerated side view of a portion of azimuth positioning system 22 demonstrating a brake-released condition 110 of second brake system 48B. Brake-engaged condition 108 represents the situation of task 104 in which first and second brake pads 56 and 58 are engaged with collar 46 and exert a clamping pressure on collar 46 adequate to hold solar collector 28 stationary in the presence of moderate winds. Due to braking force 66 imparted on first and second brake pads 56 and 58, the attached first and second tines 96 and 98 of elongate member 90 are flexed toward one another. The flexing of first and second tines 96 and 98, respectively, is greatly exaggerated in FIG. 7 for illustrative purposes only.

Brake-released condition 110 represents the situation of task 106 in which first and second brake pads 56 and 58 of second brake system 48B (FIG. 3) are removed from engagement with collar 46, or at least refrain from exerting a significant amount of clamping pressure on collar 46. Since braking force 66 is now removed from first and second brake pads 56 and 58, the attached first and second tines 96 and 98 of elongate member are free to spring back to their original position. Since first and second tines 96 and 98 readily flex in response to the presence of braking force 66, more complex bearings, joints, and other linkage are not needed. This simplifies design and manufacturing, and decreases potential for positional error. The separation between first and second brake pads 56 and 58, respectively, and collar 46 is again greatly exaggerated in FIG. 8 for illustrative purposes only.

With reference back to rotation control process 102 (FIG. 6), once second brake system 48B is in brake-released condition 110 (FIG. 8), and with first brake system 48A maintaining brake-engaged condition 108 (FIG. 7), a task 112 is performed. At task 112, first linear actuator 82A (FIG. 5) is activated. In a preferred embodiment, rod 88 (FIG. 4) of first linear actuator 82A has a very short stroke, in the range of 0.0625 to 4 inches. This short stroke is transmitted through first and second tines 96 and 98 (FIG. 4) of elongate member 90 (FIG. 4) to first and second brake pads 56 and 58 of first brake system 48A (FIG. 5). Due to the clamping action of first and second brake pads 56 and 58, respectively, operating on collar 46 at a radius of approximately twenty-four inches away from azimuth axis 36, this linear motion is translated into rotational motion. The clamping action yields a friction coupling for the transmission of power for rotation of an object. This friction coupling largely eliminates sources of backlash, such as bearing connections that have finite mechanical lash tolerances.

Figure 9:
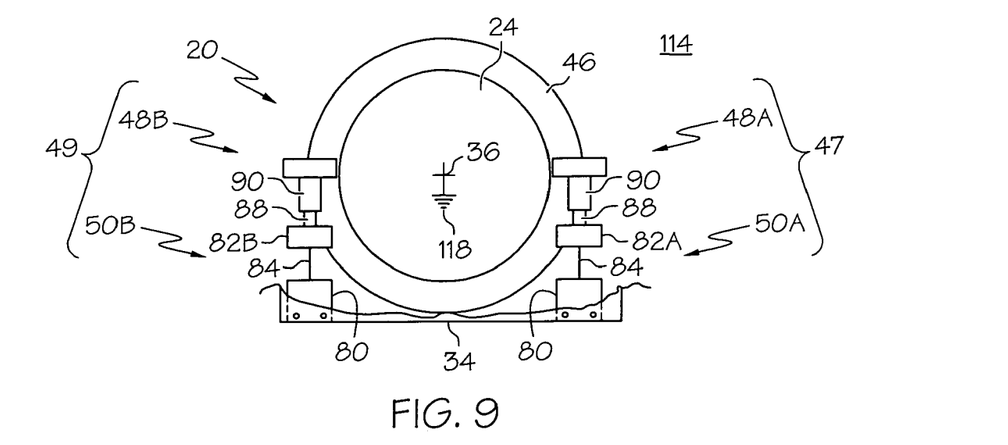
FIG. 9 shows a simplified top view of a portion of the solar collection device demonstrating a non-rotation scenario.
Figure 10:
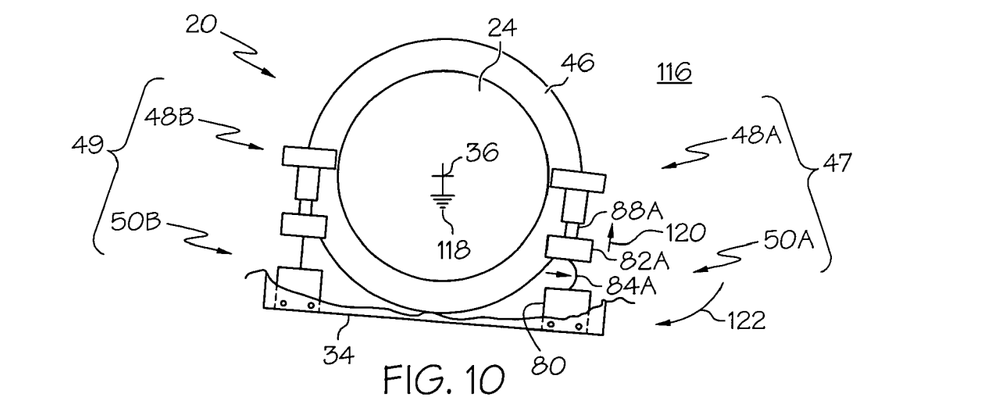
FIG. 10 shows a simplified top view of a portion of the solar collection device demonstrating a first rotation scenario.

Referring to FIGS. 9-10 in connection with task 112, FIG. 9 shows a simplified top view of a portion of the solar collection device 20 demonstrating a non-rotation scenario 114. FIG. 10 shows a simplified top view of a portion of solar collection device 20 demonstrating a first rotation scenario 116. For clarity of illustration, solar collection device 20 is shown with cradle 34 partially cutaway and solar collector 28 omitted in each of FIGS. 9-10. This enables visualization of first and second drives 47 and 49.

It bears repeating that base 24 is anchored into the ground, and collar 46 is fixedly attached about base 24, with no relative movement between collar 46 and base 24. An earth symbol 118 is utilized herein to represent this fixation, i.e., non-rotation, of base 24 and collar 46 relative to the Earth. In this exemplary embodiment, the "object" being rotated relative to base 24 is cradle 34 with the attached solar collector 28 (FIG. 1). For purposes of distinction, a reference number that includes the designator "A" appended thereto pertains to first brake system 48A and/or first rotation actuation system 50A. Similarly, a reference number that includes the designator "B" appended thereto pertains to second brake system 48B and/or second rotation actuation system 50B.

Non-rotation scenario 114 represents an initial position of cradle 34 from which rotation of cradle 34 about azimuth axis 36 will commence. First rotation scenario 116 represents a change of position of cradle 34 about azimuth axis 36 in response to the activation of first linear actuator 82A at task 112 (FIG. 6). In this situation, it has been determined that cradle 34 should be rotated about azimuth axis 36 in a clockwise direction when viewed from above. Activation of first linear actuator 82A generates linear motion, represented by an arrow 120, of rod 88A. In this case, linear motion 120 of rod 88A is an extension of rod 88A.

As rod 88A is extended, rod 88A pushes cradle 34 through the connection of coupling element 80 causing cradle 34 to rotate clockwise. That is, linear motion 120 of rod 88A causes rotational motion, represented by an arrow 122, of cradle 34 and the attached solar collector 28 (FIG. 1). A small amount of horizontal flexing of first strap member 84A occurs as first and second brake pads 56 and 58 (FIG. 4) of first brake system 48A follow an arc rather than a straight line and small rotation. The flexing of first strap member 84A is greatly exaggerated in FIG. 10 for illustrative purposes only. Those skilled in the art will understand that first strap member 84A will flex very slightly, the amount of flex corresponding to the amount of linear motion 120 of rod 88A and the radial distance from azimuth axis 36.

In an exemplary embodiment, rod 88A may be extended the full stroke-length in one continuous movement. Alternatively rod 88A may be extended in a pulsed mode in which rod 88A is extended in small increments of, for example, one sixteenth of an inch, until rod 88A has extended the full stroke-length.

With reference back to rotation control process 102 of FIG. 6 and continued reference to FIG. 10, process control proceeds from task 112 to a task 124. When rod 88A reaches the end of its stroke, first linear actuator 82A is deactivated at task 124.

Following task 124, a task 125 is performed. At task 125, second brake system 48B is allowed to engage with collar 46. It should be recalled that an earlier task 106 caused second brake system 48B to be released from engagement with collar 46. Task 125 causes second brake system 48B to engage with collar 46 by imparting braking force 66 toward first and second brake pads 56 and 58 of second brake system 48B.

Next, a task 126 is performed to release first brake system 48A from engagement with collar 46. Task 126 is accomplished by removing braking force 66 thereby releasing the clamping pressure between first and second brake pads 56 and 58 of first brake system 48A.

Following task 126, a task 128 is performed to return first rod 88A from its now extended position to a reset position. In one example, the reset position is positioned at an intermediate location of the stroke for first rod 88A, rather than at the end of the stroke. Since first and second brake pads 56 and 58, respectively, (FIG. 5) of first brake system 48A are released from collar 46, they will freely slide along collar 46 as first rod 88A is retracted.

A query task 130 next determines whether the object, e.g., cradle 34 with solar collector 28 (FIG. 1) is in a desired azimuth position. When cradle 34 and solar collector 28 are in the desired position, process control proceeds to a task 152. At task 152, both first and second brake systems 48A and 48B are allowed to engage with collar 46. That is, braking force 66 (FIG. 4) is restored so that both first and second brake systems 48A and 48B again maintain their respective first and second brake pads 56 and 58 (FIG. 4) in engagement with collar 46. Following task 132, rotation control process 102 exits with cradle 34 and solar collector 28 in the desired azimuth position.

When query task 130 determines that cradle 34 and solar collector 28 are not yet in the desired position, process control proceeds to a task 134. Task 134 merely selects the other drive, i.e. second drive 49 (FIG. 3), to continue the rotation of cradle 34 with solar collector 28 in the same direction.

In response to task 134, a task 138 is performed. Task 138 mimics task 112. More specifically, second linear actuator 82B (FIG. 5) of second rotation actuation system 50B (FIG. 5) is now activated.

Figure 11:
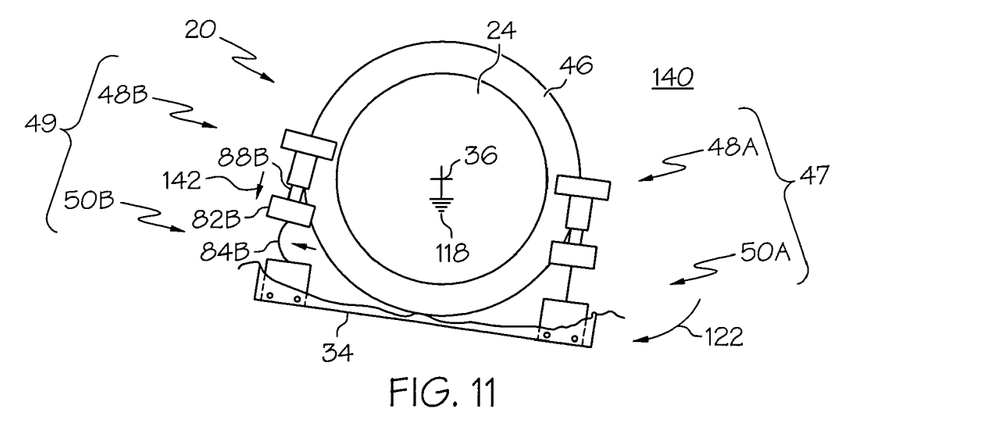
FIG. 11 shows a simplified top view of a portion of the solar collection device demonstrating a second rotation scenario.

Referring to FIG. 11 in connection with task 138, FIG. 11 shows a simplified top view of a portion of solar collection device 20 demonstrating a second rotation scenario 140. Second rotation scenario 140 represents a change of position of cradle 34 about azimuth axis 36 in response to the activation of second linear actuator 82B at task 138 (FIG. 6). To continue motion of cradle 34 in the clockwise direction, rod 88B is now retracted. Activation of second linear actuator 82B at task 138 generates linear motion, represented by an arrow 142, of rod 88B. In this case, linear motion 142 of rod 88B is a retraction of rod 88B.

As rod 88B is retracted, rod 88B pulls cradle 34 causing cradle 34 to rotate clockwise. That is, linear motion 142 of rod 88B causes continued rotational motion 122 of cradle 34 and the attached solar collector 28 (FIG. 1). Again, a small amount of horizontal flexing of second strap member 84B occurs as first and second brake pads 56 and 58 (FIG. 4) of second brake system 48B follow an arc rather than a straight line and small rotation. Like rod 88A, rod 88B may be retracted the full stroke-length in one movement, or alternatively rod 88B may be retracted in the pulsed mode discussed above.

With reference back to rotation control process 102 of FIG. 6 and continued reference to FIG. 11, process control proceeds from task 138 to a task 144. When rod 88B reaches the end of its stroke, second linear actuator 82B is deactivated at task 144.

Following deactivation of second linear actuator 82B at task 144, a task 145 is performed. At task 145, first brake system 48A is caused to engage with collar 46 by imparting braking force 66 toward first and second brake pads 56 and 58 toward first brake system 48A.

Next, a task 146 is performed to release second brake system 48B from engagement with collar 46 by removing braking force 66 thereby releasing the clamping pressure between first and second brake pads 56 and 58 of second brake system 48B.

Following task 146, a task 148 is performed to return second rod 88B from its now retracted position to a reset position. Since first and second brake pads 56 and 58, respectively, (FIG. 5) of second brake system 48B are released from collar 46, they will freely slide along collar 46 as second rod 88B is extended.

A query task 150 next determines whether the object, i.e., cradle 34 with solar collector 28 (FIG. 1) is in the desired azimuth position. When cradle 34 and solar collector 28 are in the desired position, process control proceeds to task 152 so that first and second brake systems 48A and 48B are caused to engage with collar 46, as discussed above.

However, when query task 150 determines that cradle 34 and solar collector 28 are still not in the desired position, process control loops back to task 104 to repeat rotation control process 102 alternately utilizing first drive 47, and then utilizing second drive 49, until cradle 34 and solar collector 28 are in the desired azimuth position.

Although the present invention is described in terms of two drives 47 and 49 for the precise rotation of solar collector 28, it should be understood that various drive scenarios can be envisioned that are within the scope of the present invention. For example, in an alternative embodiment, only one drive, with a single brake system and linear actuator system may be employed with or without a separate brake for gripping collar 46 when the single linear actuator is returning to an initial position. Such a system may be used in conjunction with another positioning system that may not achieve a desired positional accuracy. Thus, the other positioning system may be used to provide coarse positioning while the drives 47 and/or 49 may be used to provide fine positioning. Alternatively, inherent friction could allow the single drive system to be used alone. In other alternative embodiments, more than two drives may be employed that work in concert to cause rotation of an object.

As discussed above, first and second brake systems 48A and 48B (FIG. 3) can be maintained in engagement with collar 46 (FIG. 3) whenever, azimuth positioning system (FIG. 3) is not being driven to cause rotation of solar collector 28 (FIG. 3). Moreover, this braking force 66 (FIG. 4) of first and/or second brake pads 56 and 58, respectively, is configured to securely retain solar collector 28 (FIG. 1) under normal wind loads. However, when solar collector 28 encounters an excessive wind load, especially a sudden onset of such, first and/or second brake pads 56 and 58, respectively, will slip along collar 46. This slippage allows solar collector 28 to rotate when an extremely high wind is encountered, thus limiting and/or preventing structural damage.

In summary, the present invention teaches of a system for orienting a large object relative to a base. Positional accuracy results through the use of a friction drive system for direct coupling between a linear drive, i.e. the elongate member, the linear actuator, strap member, and the coupling element, and a rotary mechanism, i.e. the turntable bearing of the base. This direct coupling eliminates sources of backlash, such as those found in bearing or gear connections that have finite mechanical lash tolerances and/or high cost. In addition, the interconnection of the components of the linear drive are accomplished by firmly connected solid elements, i.e., welded and bolted joints, also with no mechanical lash elements. The elongate member and strap member are relatively soft in flexure, but stiff in tension and compression. Consequently, the system can accommodate lateral and vertical movement of internal elements through the flexure of elongate member and strap member. The mechanism allows the linear components to be more easily manufactured as stiff as needed, by using short-stroke and strong actuators. Thus, any oil, entrained air, and steel compression have a minimal impact. Moreover, the clamping actuation of the brakes provides a non-destructive friction-slip yield point during excessive wind load conditions.

Although the preferred embodiments of the invention have been illustrated and described in detail, it will be readily apparent to those skilled in the art that various modifications may be made therein without departing from the spirit of the invention or from the scope of the appended claims. For example, the present invention may be adapted to include a number of linear drives and/or to be used to rotate small objects with a high degree of positional certainty. Moreover, linear actuators, other than hydraulic linear actuators, may be adapted for use in connection with the present invention.

What is claimed is:

1. A system for orienting an object relative to a base to which said object is rotatably coupled, said system comprising:
    a braking surface in fixed relation with said base;
    a brake engaged with said braking surface; and
    a linear actuator having a body and a rod extensible from said body, said body being configured for fixed attachment with said object, said rod being in fixed communication with said brake, and said linear actuator being activated to generate linear motion of said rod, said linear motion causing rotational motion of said object about said base when said brake is engaged with said braking surface.

2. A system as claimed in claim 1 wherein said brake comprises:
    a caliper having first and second arms straddling said braking surface;
    a first brake pad on said first arm; and
    a second brake pad on said second arm, said first and second brake pads pressing against opposing sides of said braking surface when said brake is engaged.

3. A system as claimed in claim 1 wherein said braking surface is a collar configured for fixed attachment about said base.

4. A system as claimed in claim 1 wherein said brake comprises:
    a brake pad pressing against said braking surface when said brake is engaged; and
    a brake actuator in communication with said brake pad for controlling an engagement of said brake pad with said braking surface.

5. A system as claimed in claim 4 wherein said brake actuator is a hydraulic linear actuator.

6. A system as claimed in claim 1 wherein said brake is a first brake, said linear actuator is a first linear actuator, and said system further comprises:

a second brake for engagement with said braking surface; and a second linear actuator having a second body and a second rod extensible from said second body, said second body being configured for fixed attachment with said object, said second rod being in fixed communication with said second brake, and said second linear actuator being activated to generate said linear motion of said second rod to cause said rotational motion of said object about said base when said second brake is engaged with said braking surface.

7. A system as claimed in claim 6 further comprising a controller in communication with said first and second brakes and said first and second linear actuators for controlling an activation of one of said first and second linear actuators corresponding to one of said first and second brakes currently engaged with said braking surface.

8. A system as claimed in claim 6 wherein said second brake is located on an opposing diametrical side of said braking surface relative to said first brake.

9. A system as claimed in claim 1 wherein said linear actuator is a hydraulic linear actuator.

10. A system as claimed in claim 1 further comprising an elongate member having a first end coupled to said rod and having a second end coupled to said brake, said linear motion being transmitted through said elongate member.

11. A system as claimed in claim 1 wherein said braking surface exhibits a radius of at least twenty inches from a pivot point about which said object is rotated.

12. A system as claimed in claim 1 wherein said brake imparts a braking force on said braking surface, said object is occasionally subjected to a wind load that exceeds said braking force, and said brake is configured to slip along said braking surface in response to said wind load.

13. A system as claimed in claim 1 wherein said system orients said object in azimuth.

14. A system as claimed in claim 1 wherein said object is a solar collector.

15. A system as claimed in claim 1 wherein said object has a surface that exhibits an area of at least 100 $m^2$.

16. A system for orienting an object relative to a base to which said object is rotatably coupled, said system comprising:
a braking surface in fixed relation with said base;
a brake engaged with said braking surface, said brake imposing a braking force on said braking surface when said brake is engaged;
a linear actuator having a body and a rod extensible from said body, said body being configured for fixed attachment with said object, said rod being in fixed communication with said brake; and
an elongate member having a first end coupled to said rod and having a second end coupled to said brake, said linear actuator being activated to generate linear motion of said rod, said linear motion being transmitted through said elongate member, said linear motion causing rotational motion of said object about said base, and said elongate member being configured to flex in response to said braking force.

17. A system for orienting an object relative to a base to which said object is rotatably coupled, said system comprising:
a braking surface in fixed relation with said base;
a brake engaged with said braking surface, said brake including a first brake pad and a second brake pad, said first and second brake pads pressing against opposing sides of said braking surface when said brake is engaged;
a linear actuator having a body and a rod extensible from said body, said body being configured for fixed attachment with said object, said rod being in fixed communication with said brake; and
an elongate member having a first end coupled to said rod and having a second end, said second end of said elongate member including a first tine coupled to said first brake pad and a second tine coupled to said second brake pad, said linear actuator being activated to generate linear motion of said rod, said linear motion being transmitted through said elongate member, and said linear motion causing rotational motion of said object about said base.

18. A system for orienting an object relative to a base to which said object is rotatably coupled, said system comprising:
a braking surface in fixed relation with said base;
a brake engaged with said braking surface;
a linear actuator having a body and a rod extensible from said body, said body being configured for fixed attachment with said object, said rod being in fixed communication with said brake, and said linear actuator being activated to generate linear motion of said rod, said linear motion causing rotational motion of said object about said base;
a coupling element configured for attachment to said object; and
a strap member attached to and extending between said coupling element and said body of said linear actuator, said strap member flexing in response to said linear motion of said rod.

19. A method for orienting an object relative to a base to which said object is rotatably coupled utilizing a positioning system that includes a braking surface in fixed relation with said base, a brake, and a linear actuator having a body in fixed attachment with said object and a rod extensible from said body and in fixed communication with said brake, said method comprising:
engaging said brake with said braking surface; and
when said brake is engaged with said braking surface, activating said linear actuator to generate linear motion of said rod, said linear motion causing rotational motion of said object about said base.

20. A method as claimed in claim 19 further comprising:
determining that said rod has moved a pre-determined stroke distance;
releasing said brake from said braking surface; and
returning said rod to a reset position.

21. A method as claimed in claim 20 further comprising repeating said engaging, activating, determining, releasing, and returning operations until said object is oriented to a desired position.

22. A method as claimed in 20 wherein said brake is a first brake, said linear actuator is a first linear actuator, and said positioning system further includes a second brake, and a second linear actuator having a second body in fixed attachment with said object and a second rod extensible from said second body and in fixed communication with said second brake, and said method further comprises:
alternately selecting one of said first and second brakes for engagement with said braking surface; and
performing said engaging, activating, determining, releasing, and returning operations for said selected one of said first and second brakes.

23. A system for orienting an object relative to a base to which said object is rotatably coupled, said system comprising:
a collar configured for fixed attachment about said base;
a first brake for selective engagement with said collar;
a first hydraulic actuator having a first body and a first rod extensible from said first body, said first rod being in fixed communication with said first brake;
a second brake for selective engagement with said collar; and
a second hydraulic actuator having a second body and a second rod extensible from said second body, said second rod being in fixed communication with said second brake, said first and second bodies being configured for fixed attachment with said object, wherein one of said first and second hydraulic actuators associated with a currently engaged one of said first and second brakes is activated to generate linear motion of a related one of said first and second rods, said linear motion causing rotational motion of said object about said base.

24. A system as claimed in claim 23 wherein said collar exhibits a radius of at least twenty inches from a pivot point about which said object is rotated.

25. A system as claimed in claim 23 wherein said second brake is located on an opposing diametrical side of said collar relative to said first brake.

26. A system as claimed in claim 23 wherein said currently engaged one of said first and second brakes imparts a braking force on said collar, said object is occasionally subjected to a wind load that exceeds said braking force, and said engaged brake is configured to slip along said collar in response to said wind load.

27. A system as claimed in claim 26 wherein said object has a surface that exhibits an area of at least 100 m².

28. A system for orienting a object relative to a base to which said object is rotatably coupled, said system comprising:
a collar configured for fixed attachment about said base;
a brake for engagement with said collar;
a coupling element configured for attachment to said object;
a strap member attached to said coupling element;
a linear actuator having a body and a rod extensible from said body, said body being coupled to said strap member, said rod being in fixed communication with said brake, and said linear actuator being activated to generate linear motion of said rod, said linear motion causing rotational motion of said object about said base when said brake is engaged with said collar, and said strap member flexing in response to said linear motion of said rod.

29. A system as claimed in claim 28 wherein said brake comprises:
a caliper having first and second arms straddling said collar;
a first brake pad in communication with said first arm; and
a second brake pad in communication with said second arm, said first and second brake pads pressing against opposing sides of said collar when said brake is engaged.

30. A system as claimed in claim 29 wherein:
said brake further comprises a brake actuator for controlling a braking force on said first and second brake pads, said braking force driving said first and second brake pads against said collar; and
said system further comprises an elongate member having a first end coupled to said rod and having a second end in communication with said first and second brake pads, said elongate member flexing in response to said braking force.

* * * * *